United States Patent
Tanaka et al.

(10) Patent No.: US 9,945,233 B2
(45) Date of Patent: Apr. 17, 2018

(54) DOUBLE-JET FILM COOLING STRUCTURE AND METHOD FOR MANUFACTURING SAME

(71) Applicants: KAWASAKI JUKOGYO KABUSHIKI KAISHA, Kobe-shi, Hyogo (JP); B&B AGEMA GmbH, Aachen (DE)

(72) Inventors: Ryozo Tanaka, Kakogawa (JP); Takao Sugimoto, Kobe (JP); Masahide Kazari, Akashi (JP); Tomoki Taniguchi, Kobe (JP); Karsten Kusterer, Moresnet (BE); Dieter Bohn, Moers (DE); Nurettin Tekin, Aachen (DE)

(73) Assignees: KAWASAKI JUKOGYO KABUSHIKI KAISHA, Kobe-shi (JP); B&B AGEMA GmbH, Aachen (DE)

( * ) Notice: Subject to any disclaimer, the term of this patent is extended or adjusted under 35 U.S.C. 154(b) by 349 days.

(21) Appl. No.: 14/944,503

(22) Filed: Nov. 18, 2015

(65) Prior Publication Data

US 2016/0069192 A1 Mar. 10, 2016

Related U.S. Application Data

(63) Continuation of application No. PCT/JP2014/063517, filed on May 21, 2014.

(30) Foreign Application Priority Data

May 22, 2013 (JP) .................................. 2013-108333

(51) Int. Cl.
*F01D 5/18* (2006.01)
*B23H 9/10* (2006.01)
(Continued)

(52) U.S. Cl.
CPC ............... *F01D 5/186* (2013.01); *B23H 1/04* (2013.01); *B23H 9/10* (2013.01); *B23H 9/14* (2013.01);
(Continued)

(58) Field of Classification Search
CPC .................................. F01D 5/186; F01D 9/065
See application file for complete search history.

(56) References Cited

U.S. PATENT DOCUMENTS 7,328,580 B2 * 2/2008 Lee ...................... B23K 26/384
415/115
8,529,193 B2 * 9/2013 Venkataramanan .... F01D 5/186
415/115

(Continued)

FOREIGN PATENT DOCUMENTS

CN 102261281 A 11/2011
EP 1609949 A 12/2005
(Continued)

OTHER PUBLICATIONS

International Preliminary Report on Patentability dated Dec. 3, 2015, issued by the International Bureau in corresponding International Application No. PCT/JP2014/063517.
(Continued)

*Primary Examiner* — Justin Seabe
*Assistant Examiner* — Behnoush Haghighian
(74) *Attorney, Agent, or Firm* — Sughrue Mion, PLLC (57) ABSTRACT

A double-jet film cooling structure includes: an injection port, formed on a wall surface facing a high-temperature gas passage; a main passage as a straight round hole to supply cooling medium to the injection port; a pair of branch passages as straight round holes; and communication passages connecting the main passage to the branch passages. The main passage and the branch passages have same
(Continued)

constant inner diameters. Each communication passages has an envelope surface obtained by continuously arranging straight round holes each passing a branch point and having the constant inner diameter. Transverse injection angles of the branch passages relative to gas flow along the wall surface are oriented in opposite directions. An angle between axial direction of the main passage and the wall surface is greater than an angle formed between axial direction of branch passage and the wall surface.

8 Claims, 9 Drawing Sheets

(51) Int. Cl.
  *B23H 1/04* (2006.01)
  *B23H 9/14* (2006.01)
  *F23R 3/06* (2006.01)
  *F01D 9/06* (2006.01)

(52) U.S. Cl.
  CPC ............... *F01D 9/065* (2013.01); *F23R 3/06* (2013.01); *F05D 2230/12* (2013.01); *F05D 2240/11* (2013.01); *F05D 2240/81* (2013.01); *F05D 2250/14* (2013.01); *F05D 2250/231* (2013.01); *F05D 2250/75* (2013.01); *F05D 2260/202* (2013.01); *F23R 2900/03042* (2013.01)

(56) References Cited

U.S. PATENT DOCUMENTS

| | | | |
|---|---|---|---|
| 8,584,470 | B2 | 11/2013 | Zelesky et al. |
| 8,683,813 | B2 | 4/2014 | Xu et al. |
| 8,689,568 | B2 | 4/2014 | Kohli et al. |
| 8,707,713 | B2 | 4/2014 | Levasseur et al. |
| 8,733,111 | B2 | 5/2014 | Gleiner et al. |
| 8,763,402 | B2 | 7/2014 | Xu et al. |
| 8,850,828 | B2 | 10/2014 | Mongillo, Jr. et al. |
| 8,905,713 | B2 | 12/2014 | Bunker et al. |
| 8,978,390 | B2 | 3/2015 | Levasseur et al. |
| 9,024,226 | B2 * | 5/2015 | Levasseur ............... B23H 9/10 219/69.17 |
| 9,273,560 | B2 | 3/2016 | Gleiner et al. |
| 9,410,435 | B2 * | 8/2016 | Xu .......................... F01D 5/186 |
| 9,482,100 | B2 | 11/2016 | Kohli et al. |
| 9,599,411 | B2 * | 3/2017 | Tanaka ................... F01D 5/186 |
| 2005/0286998 | A1 | 12/2005 | Lee et al. |
| 2008/0003096 | A1 | 1/2008 | Kohli et al. |
| 2011/0123312 | A1 | 5/2011 | Venkataramanan et al. |
| 2011/0293423 | A1 | 12/2011 | Bunker et al. |
| 2013/0175015 | A1 | 7/2013 | Tanaka et al. |
| 2013/0205786 | A1 | 8/2013 | Kohli et al. |
| 2013/0205787 | A1 | 8/2013 | Zelesky et al. |
| 2013/0205790 | A1 | 8/2013 | Xu et al. |
| 2013/0205791 | A1 | 8/2013 | Mongillo, Jr. et al. |
| 2013/0205792 | A1 | 8/2013 | Gleiner et al. |
| 2013/0205801 | A1 | 8/2013 | Xu et al. |
| 2013/0205802 | A1 | 8/2013 | Levasseur et al. |
| 2013/0206733 | A1 | 8/2013 | Levasseur et al. |
| 2013/0206739 | A1 | 8/2013 | Reed et al. |
| 2013/0209269 | A1 | 8/2013 | Gleiner et al. |
| 2014/0116666 | A1 * | 5/2014 | Xu .......................... F01D 9/065 165/169 |
| 2014/0193246 | A1 | 7/2014 | Levasseur et al. |
| 2014/0219815 | A1 | 8/2014 | Kohli et al. |

FOREIGN PATENT DOCUMENTS

| | | |
|---|---|---|
| EP | 2554792 A1 | 2/2013 |
| JP | 2001-012204 A | 1/2001 |
| JP | 2006-009785 A | 1/2006 |
| JP | 2008-008288 A | 1/2008 |
| JP | 2011-247248 A | 12/2011 |
| JP | 4954309 B2 | 6/2012 |
| WO | 2013165511 A2 | 11/2013 |

OTHER PUBLICATIONS

Communication dated Apr. 21, 2016, from the State Intellectual Property Office of People's Republic of China in counterpart Application No. 201480029137.8.
Communication dated Dec. 29, 2016 from the State Intellectual Property Office of the P.R.C. in counterpart application No. 201480029137.8.
Communication dated Dec. 12, 2016 from the Canadian Intellectual Property Office in counterpart application No. 2912828.
Communication dated Feb. 7, 2017, from the European Patent Office in counterpart European Application No. 14800768.5.
Japanese Notification of Reason(s) for Rejection issued in JP 2013-108333 dated Feb. 25, 2014.
Japanese Decision of Grant issued in JP 2013-108333 dated Apr. 8, 2014.
International Search Report of PCT/JP2014/063517 dated Aug. 19, 2014.

* cited by examiner

DOUBLE-JET FILM COOLING STRUCTURE AND METHOD FOR MANUFACTURING SAME

CROSS REFERENCE TO THE RELATED APPLICATION

This application is a continuation application, under 35 U.S.C. § 111(a), of international application No. PCT/JP2014/063517, filed May 21, 2014, which claims priority to Japanese patent application No. 2013-108333, filed May 22, 2013, the disclosure of which are incorporated by reference in their entirety into this application.

BACKGROUND OF THE INVENTION

Field of the Invention

The present invention relates to a film cooling structure in which injection ports are provided on a wall surface facing a high-temperature gas passage, such as a rotor blade, a stator blade, and an inner tube of a combustor in a gas turbine engine, and cooling of the wall surface is performed by causing a cooling medium injected from the injection ports to flow along the wall surface.

Description of Related Art

Conventionally, many injection ports are provided on a wall surface such as a rotor blade in a gas turbine engine (hereinafter simply referred to as "gas turbine") such that the injection ports are oriented in the same direction. A film flow of a cooling medium such as air injected from these injection ports cools the wall surface, which is exposed to a high-temperature gas. As such a film cooling structure, a structure has generally been proposed in which a round hole is provided in a wall so as to be inclined toward a downstream side of a high-temperature gas, and a cooling medium is injected from an oval injection port opened at the surface of the wall. However, cooling efficiency of this cooling structure is poor. Therefore, improved cooling structures, such as a structure in which an injection port for jetting a cooling medium to a wall surface has a bilobed shape (Patent Document 1) and a structure in which a distribution portion is provided between a pair of injection ports (Patent Document 2), have been known.

RELATED DOCUMENT

Patent Document

[Patent Document 1] JP Laid-Open Patent Publication No. 2008-8288

[Patent Document 2] JP Patent Publication No. 4954309

SUMMARY OF THE INVENTION

According to the cooling structure of Patent Document 1, cooling effect can be enhanced by increasing the width of the cooling medium along the wall surface. The reason seems to be that film efficiency indicating cooling efficiency on the wall surface is increased. The film efficiency is expressed as $\eta f, ad = (Tg-Tf)/(Tg-Tc)$, in which Tg is a temperature of the high-temperature gas, Tf is a surface temperature of the wall surface, and Tc is a temperature of the cooling medium on the wall surface. However, since the shape of a center portion of the injection port is not a simple oval but is composed of a plurality of curves each having a radius of curvature (paragraphs 0016 to 0017), the number of manufacturing processes increases. In Patent Document 2, film efficiency can be enhanced by suppressing the cooling medium from being separated from the wall surface. However, since the distribution portion is undercut as viewed from the wall surface side, the number of manufacturing processes also increases.

Therefore, an object of the present invention is to provide a film cooling structure which is capable of efficiently cooling a wall surface, such as a rotor blade or a stator blade of a gas turbine, by suppressing cooling medium film from being separated from the wall surface, and which is easily manufactured.

In order to achieve the above object, a double-jet film cooling structure according to the present invention includes:

an injection port, formed on a wall surface facing a passage of a high-temperature gas, to inject a cooling medium toward a downstream side of the passage;

a main passage in the form of a straight round hole formed in the wall to supply the cooling medium to the injection port;

a pair of branch passages formed in the wall, branching from a branch point on the main passage, each in the form of a straight round hole having the injection port as an outlet; and communication passages formed in the wall that allow the main passage to communicate with respective branch passages and have the injection port as an outlet, the main passage, in which injection directions of cooling medium components injected from the pair of branch passages are inclined with respect to a flow direction of the high-temperature gas so as to form respective swirl flows of the cooling medium components oriented in directions to push each other against the wall surface, the main passage and the branch passages have transverse cross-sections having the same constant inner diameters, each of the communication passages has an envelope surface obtained by continuously arranging straight round holes each of which passes the branch point and has a transverse cross-section having the constant inner diameter, transverse injection angles β of the injection directions from the pair of branch passages with respect to the flow direction of the high-temperature gas, along the wall surface, are set to be oriented in opposite directions from each other with respect to the flow direction, and a main longitudinal angle α1 formed between an axial direction of the main passage and the wall surface is set to be greater than a branch longitudinal angle α2 formed between an axial direction of each branch passage and the wall surface.

According to this configuration, the transverse injection angles of the injection directions of the cooling medium from the pair of jet holes with respect to the flow direction of the high-temperature gas, along the wall surface, are set to be oriented in opposite directions from each other with respect to the flow direction. Therefore, a wide film flow of the cooling medium is effectively formed on the wall surface along the flow direction of the high-temperature gas, whereby film efficiency is enhanced.

Further, the main longitudinal angle α1 formed between the axial direction of the main passage and the wall surface is set to be greater than the branch longitudinal angle α2 formed between the axial direction of each branch passage and the wall surface. Therefore, the cooling medium components injected from the branch passages are separated by the cooling medium injected from the main passage, and a pair of straight flows having high directivities are formed. A low-pressure portion having a sufficiently low pressure is generated between the pair of straight flows having high directivities. Therefore, the swirl flows formed by the straight flows cause formation of forceful flows which are inwardly swirled from areas surrounding the straight flows to the low-pressure portion and oriented toward the wall surface. Therefore, the cooling medium is suppressed from being separated from the wall surface, and the film efficiency on the wall surface is enhanced. As a result, the wall surface is effectively cooled.

Moreover, the transverse cross-sections of the main passage and the branch passages have the same constant inner diameter. In addition, the communication passages connecting the main passage with the branch passages each have an envelope surface obtained by connecting straight round holes each of which passes the branch point and has a transverse cross-section having the constant inner diameter. Therefore, all the main passage, the branch passages, and the communication passages can be machined from the wall surface side by using a single cylindrical machining tool such as a machining electrode of electric-discharge machining. Thus, manufacture is facilitated.

That is, according to the above-mentioned configuration, separation of the cooling medium on the wall surface exposed to the high-temperature gas is suppressed to generate a favorable film flow on the wall surface. Therefore, efficient cooling of the wall surface can be performed, and the cooling structure can be easily formed.

In the film cooling structure of the present invention, an angular difference δ between the main longitudinal angle α1 and the branch longitudinal angle α2 is preferably within a range of 3 to 15 degrees. In this case, since a downstream portion of the main passage protrudes between the pair of branch passages, separation of the cooling medium components injected from the pair of branch passages is sufficiently performed. Thereby, the low-pressure portion is reliably formed between the straight flows of the cooling medium, and the swirl flows forcefully push the flows of the cooling medium against the wall surface, thereby to enhance the film efficiency.

In the film cooling structure of the present invention, a rear surface portion of the envelope surface forming the communication passages is preferably a flat surface. The "rear surface portion" means a surface positioned on the downstream side of the flow direction of the high-temperature gas. By using a simple flat surface as the rear surface portion, formation of the communication passages is facilitated.

In the film cooling structure of the present invention, a ratio Lc/H of a height Lc of a branch point of each of the branch passages to a height H of the main passage in a direction orthogonal to the wall surface is preferably within a range of 0.3 to 0.9. Thereby, the cooling medium is smoothly branched from the main passage to the branch passages.

The transverse injection angle β from each of the branch passages is preferably within a range of 10 to 45 degrees. In addition, the main longitudinal angle α1 of the main passage is preferably within a range of 10 to 45 degrees. A distance W, along the wall surface, between outlets of the pair of branch passages is preferably set within a range of 1.0D to 5.0D with respect to a constant inner diameter D of the main passage. According to these preferred configurations, forceful swirl flows oriented toward the wall surface are generated, and the wall surface can be cooled more effectively.

A manufacturing method according to the present invention is a method of forming the double-jet film cooling structure of the present invention by electric-discharge machining, and the method includes:

forming the main passage having the constant inner diameter in the wall surface facing the passage of the high-temperature gas, by use of a cylindrical machining electrode having a predetermined outer diameter; and performing discharging with the machining electrode being inclined with respect to an axis of the main passage to continuously form the passages from the communication passages to the branch passages.

According to this method, all the main passage, the branch passages, and the communication passages can be machined from the wall surface side by a single cylindrical machining electrode, and thus manufacture is facilitated.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

Hereinafter, embodiments of the present invention will be described with reference to the drawings.

Figure 1:
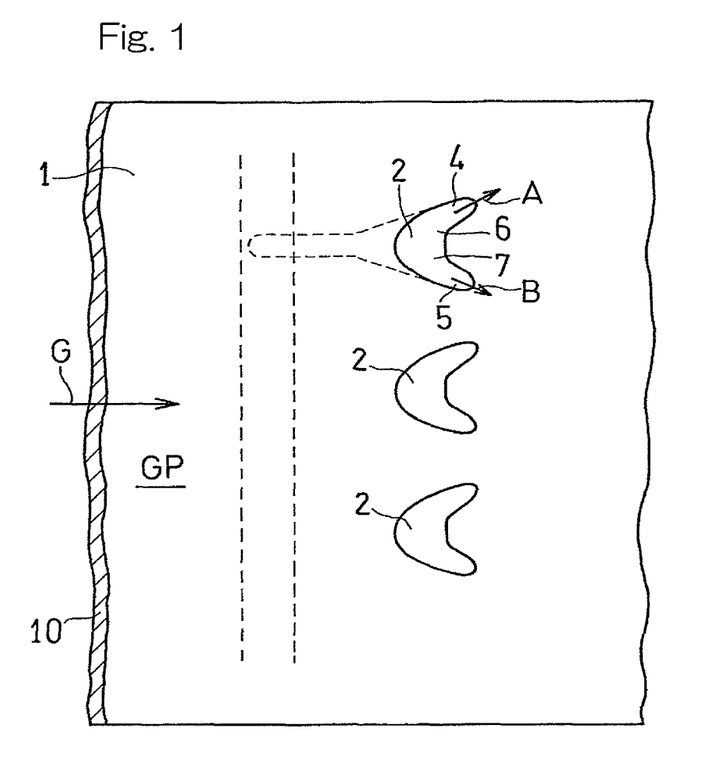
FIG. 1 is a plan view showing a portion of a wall surface exposed to a high-temperature gas, to which a film cooling structure according to one embodiment of the present invention is applied.

FIG. 1 is a plan view of a wall surface 1 to which a double-jet film cooling structure according to one embodiment of the present invention is applied. The wall surface 1 is exposed to a high-temperature gas G flowing in a direction indicated by the arrow. On the wall surface 1, a plurality of injection ports 2 through which a cooling medium such as air is injected into a passage GP of the high-temperature gas G are aligned in a direction (up-down direction in FIG. 1) substantially orthogonal to the flow direction of the high-temperature gas G. Hereinafter, an upstream side along the flow direction of the high-temperature gas G is referred to as a front side and a downstream side along the flow direction of the high-temperature gas G is referred to as a rear side.

Figure 2:
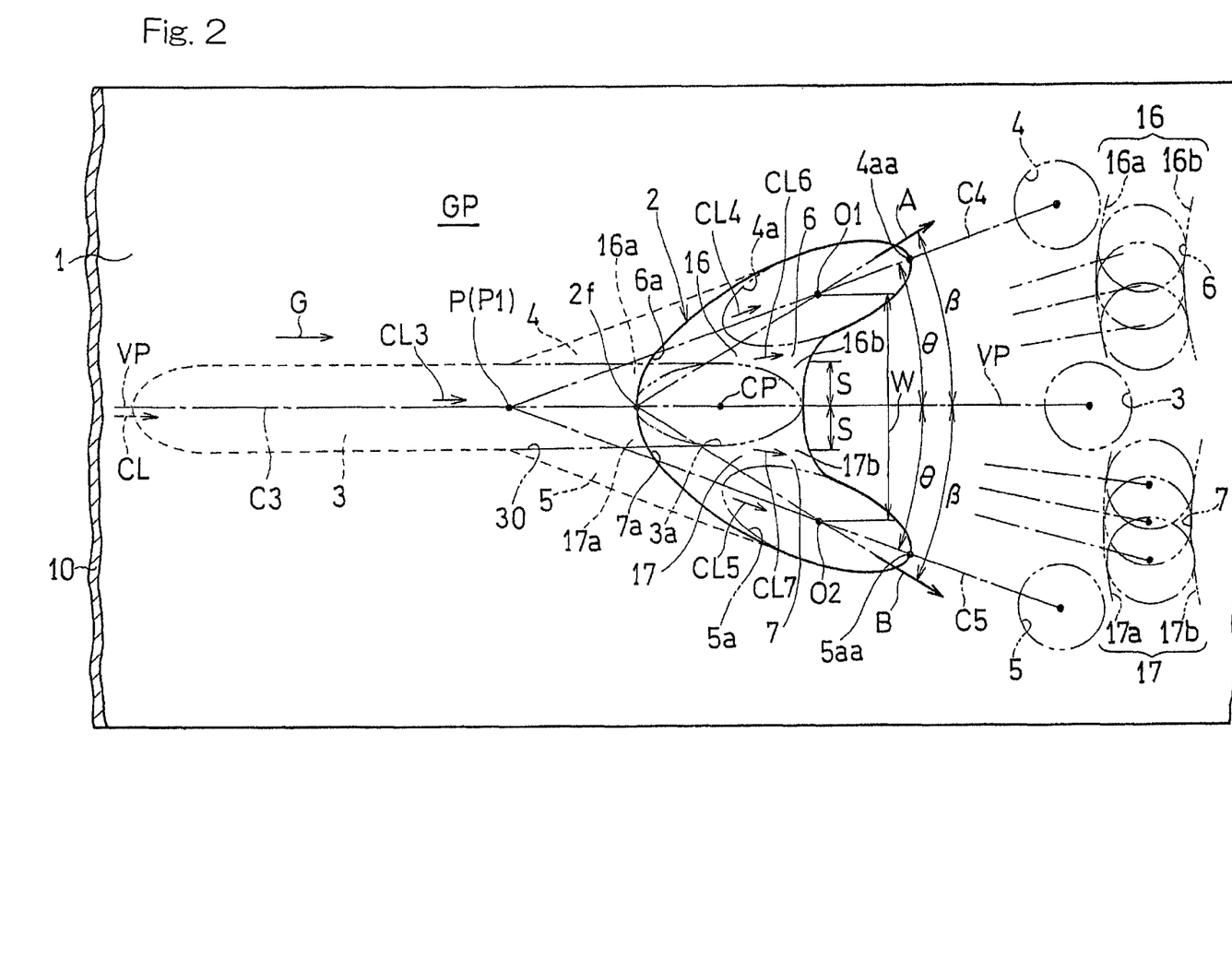
FIG. 2 is an enlarged plan view showing the wall surface on which an injection port of the film cooling structure is formed.

As shown in an enlarged plan view of FIG. 2, each injection port 2 is connected to a main passage 3 formed inside a wall 10 having the wall surface 1 as an upper surface, branch passages 4, 5 branching from the main passage 3, and communication passages 6, 7 which allow the main passage 3 to communicate with the branch passages 4, 5. In other words, the injection port 2 is formed of outlets 3a, 4a, 5a, 6a, and 7a of these passages 3 to 7. The main passage 3 is parallel with the flow direction of the high-temperature gas G in a plan view as viewed from the direction orthogonal to the wall surface 1. The branch passages 4, 5 branch from the main passage 3 in a transverse direction (up-down direction of FIG. 1) with respect to the flow direction of the high-temperature gas G. The communication passages 6, 7 allow the main passage 3 to communicate with the branch passages 4, 5, respectively, in the transverse direction (up-down direction in FIG. 1) with respect to the flow direction. These passages 3 to 7 form a collective passage having a plane-symmetrical shape with respect to an orthogonal plane VP which includes an axis C3 of the main passage 3 and is orthogonal to the wall surface 1. As described later, the passages 3 to 7 are formed by, for example, electric-discharge machining.

The branch passages 4, 5 branch from a common branch point P on the axis C3 of the main passage 3. A branching angle of each of the branch passages 4, 5 as viewed from the direction orthogonal to the wall surface 1, i.e., a branching angle θ shown in FIG. 2, is preferably within a range of 5 to 30 degrees, and more preferably, 10 to 20 degrees. Injection directions A, B of cooling medium components CL4, CL5 injected from branch passage outlets 4a, 5a do not coincide with axes C4, C5 of the branch passages 4, 5, and depend on the shape of the injection port 2 as described below.

The branch passages 4, 5 are set to be oriented in different directions from each other on a plane along the wall surface 1, i.e., in a plan view as viewed from the direction orthogonal to the wall surface 1. As a result, the cooling medium components CL4, CL5 passing through the branch passages 4, 5 are injected out in directions apart from each other. In this example, the injection directions A, B are oriented in opposite directions from each other with respect to the flow direction of the high-temperature gas G in the plan view, and transverse injection angles β, along the wall surface 1, of the injection directions A, B with respect to the flow direction of the high-temperature gas G are set to the same value. The branch passage outlets 4a, 5a included in the injection port 2 have oval shapes whose major axes are the axes C4, C5 of the branch passages 4, 5. In this specification, assuming that a front end 2f of the injection port 2, i.e., an intersection point 2f of the axis C3 of the main passage 3 and an front edge of the injection port 2 in the plan view of FIG. 2, is a base point, the transverse injection angle β is defined as an angle (angle along the wall surface 1) which is formed between a straight line that passes the front end 2f of the injection port 2 and a center O1 (O2) of the branch passage outlet 4a (5a), and the axis C3.

A portion CL3 of the cooling medium CL introduced to the main passage 3 flows into a portion 30 of the main passage 3 downstream of the branch point P (hereinafter referred to as "main passage downstream portion"), and is injected from the outlet 3a in the direction along the axis C3. Each of the main passage 3 and the branch passages 4, 5 is in the form of a straight round hole having a constant inner diameter D.

Figure 3:
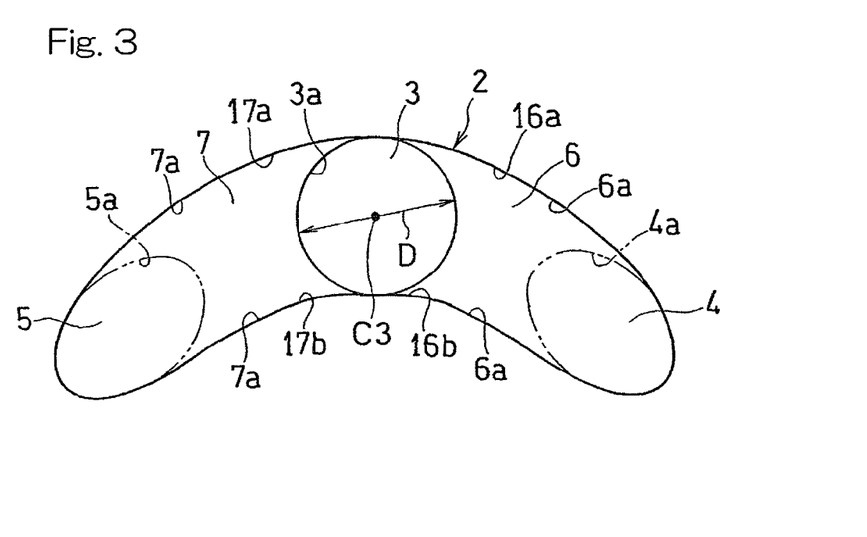
FIG. 3 is a view showing the injection port as viewed from an axial direction of a main passage.

Each of the communication passages 6, 7 includes a group of straight passages each passing the branch point P, and is formed of an envelope surface obtained by continuously arranging the passages. Each of the passages forming the passage group has a transverse cross section having the same constant inner diameter D as the main passage 3 and the branch passages 4, 5. Therefore, as shown in FIG. 3 viewed from the direction of the axis C3 of the main passage 3, the communication passage outlets 6a, 7a draw smooth curves connecting the main passage outlet 3a with the branch passage outlets 4a, 5a. The round holes forming the passages 3 to 7 are shown by alternate long and two short dashes lines in a right part of FIG. 2.

Figure 4:
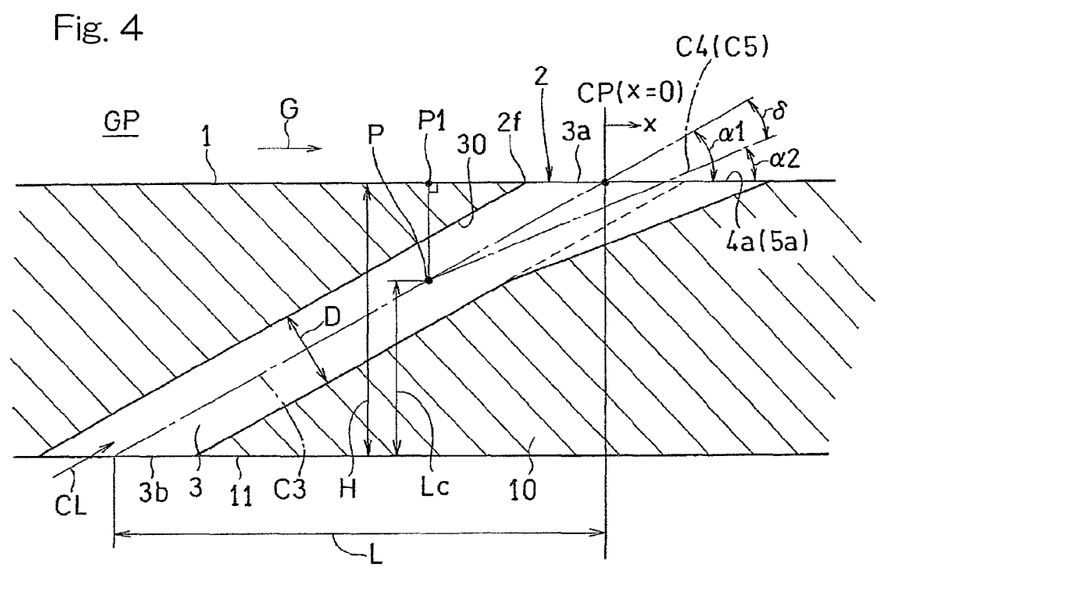
FIG. 4 is a longitudinal cross-sectional view showing a schematic configuration of the cooling structure.

As shown in FIG. 4 showing a longitudinal cross-sectional view, the main passage 3 formed penetrating through the wall 10 includes an introduction opening 3b which is opened at an inner surface 11 of the wall 10 and introduces the cooling medium CL such as air from the inside of the wall 10 into the main passage 3. The axis C3 of the main passage 3 is inclined to the downstream side of the flow direction of the high-temperature gas G, from the introduction opening 3b toward the outlet 3a at the wall surface 1 as an outer surface. Likewise, the axes C4, C5 of the branch passages 4, 5 are inclined to the downstream side of the flow direction of the high-temperature gas G, from the branch point P toward the outlets 4a, 5a.

As shown in FIG. 2, the cooling medium components CL3 to CL5 are injected from the outlets 3a to 5a to the high-temperature gas passage GP, along the axes C3 to C5 of the main passage 3 and the branch passages 4, 5. Also, portions CL6, CL7 of the cooling medium are injected from the outlets 6a, 7a of the communication passages 6, 7. A main longitudinal angle α1 formed between the axis C3 and the wall surface 1 shown in FIG. 4 is greater than a branch longitudinal angle α2 formed between the axis C4 (C5) of the branch passage 4 (5) and the wall surface 1. The branch longitudinal angles α2, α2 of the branch passages 4, 5 are the same. Since the axes C4, C5 of the branch passages 4, 5 are inclined in the transverse direction (front to rear direction of FIG. 4) to the longitudinal cross-section of FIG. 4, the magnitude of the branch longitudinal angle α2 is not accurately represented in FIG. 4. The branch longitudinal angle α2 is accurately represented in FIG. 5 which is a perspective view, and is an angle formed between the axis C4 (C5) of the branch passage 4 (5) and a line passing a virtual point P1 on the wall surface 1 immediately above the branch point P and the center O1 (O2) of the branch passage outlet 4a (5a).

As described above, the main passage 3 and the branch passages 4, 5 are inclined with respect to the wall surface 1, and further, the branch passages 4, 5 are inclined in the transverse direction with respect to the main passage 3. Therefore, all the main passage outlet 3a and the branch passage outlets 4a, 5a included in the injection port 2 shown in FIG. 2 are oval in shape. In addition, since the main longitudinal angle α1 is greater than the branch longitudinal angle α2, the branch passage outlets 4a, 5a are positioned rearward relative to the main passage outlet 3a, i.e., on the downstream side in the flow of the high-temperature gas G.

Regarding the envelope surfaces 16, 17 forming the communication passages 6, 7, front surface portions 16a, 17a thereof on the upstream side of the high-temperature gas G are smooth curved surfaces while rear surface portions 16b, 17b thereof are flat surfaces whose widths increase toward the rear side. Therefore, each of the communication passage outlets 6a, 7a is a straight line having a width S. Since the branch passages 4, 5 are geometrically clearly separated by the flat surfaces 16b, 17b, separation of the cooling medium components CL4, CL5 injected from the branch passages 4, 5 is promoted.

Figure 6:
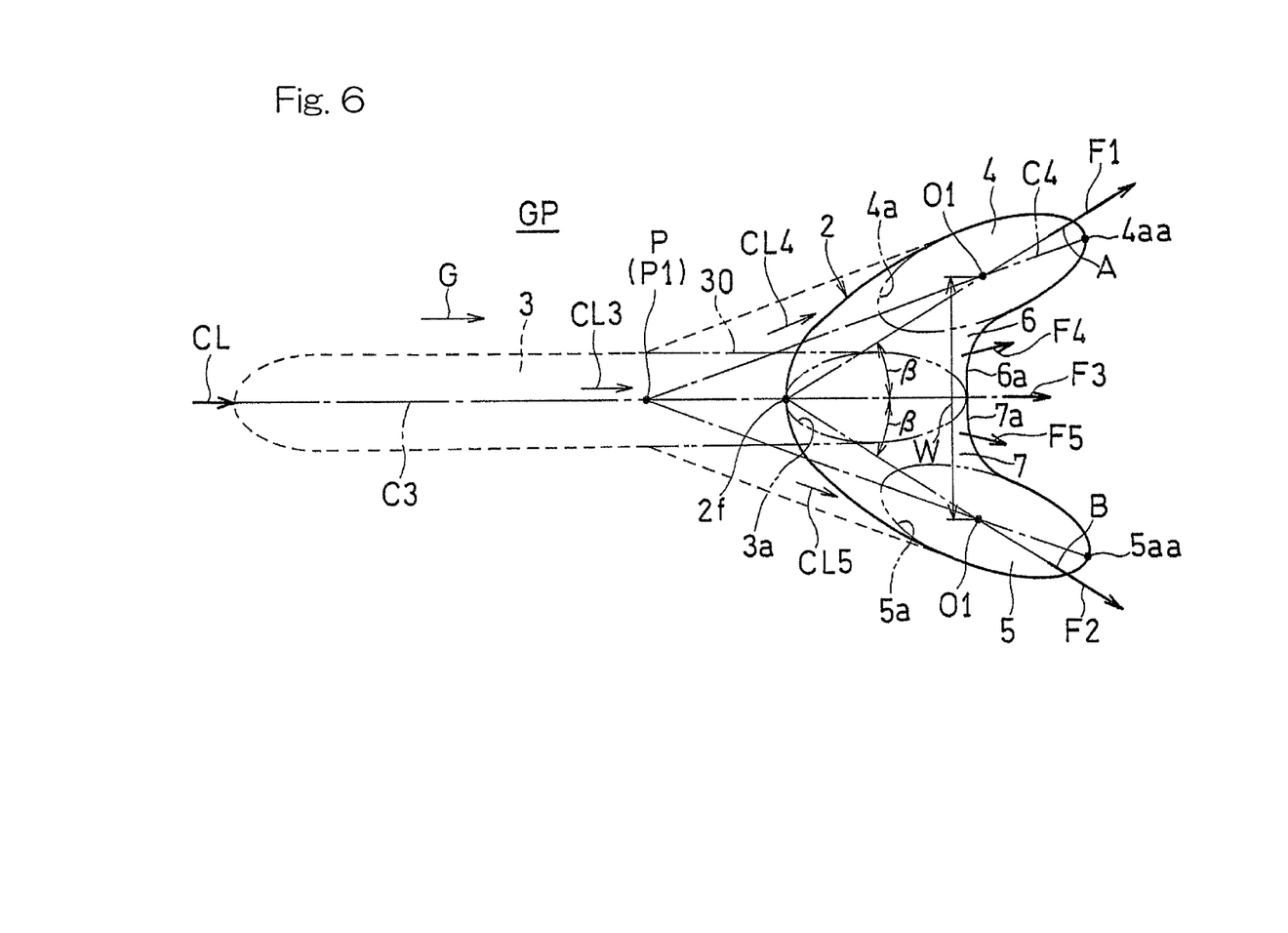
FIG. 6 is a plan view showing a flow of a cooling medium in the cooling structure.

The cooling medium components CL4, CL5 injected from the branch passage outlets 4a, 5a of the injection port 2 influence each other such that each of the cooling medium components CL4, CL5 pushes the other against the wall surface 1. This situation will be described with reference to FIGS. 6 and 7. As shown in FIG. 6, a portion of the cooling medium CL introduced to the main passage 3 flows into the branch passages 4, 5. Greater portions of the cooling medium flowing in the branch passages 4, 5, as the branch passage components CL4, CL5, are injected out, at the transverse injection angle β, as straight cooling medium flows F1, F2, from the branch passage outlets 4a, 5a to the high-temperature gas passage GP. In particular, since rear ends 4aa, 5aa of the branch passage outlets 4a, 5a are positioned rearward relative to a rear end 3aa of the main passage outlet 3a, the straight cooling medium flows F1, F2 injected from the portions of the branch passage outlets 4a, 5a that are positioned rearward relative to the main passage outlet 3a are formed as flows having high directivities.

Meanwhile, of the cooling medium CL that has passed through the main passage 3, a greater portion of the cooling medium flowing in the main passage downstream portion 30, as the main passage component CL3, is injected as a straight main separated flow F3 oriented in the direction along the axis C3, from the outlet 3a to the high-temperature gas passage GP. This separated flow F3 flows between the straight cooling medium flows F1, F2, and acts to separate the straight cooling medium flows F1, F2 from each other. Portions of the cooling medium components CL3 to CL5 that have flowed into the main passage downstream portion 30 and the branch passages 4, 5 flow into the communication passages 6, 7, and then are injected out, as sub separated flows F4, F5, from the outlets 6a, 7a to the high-temperature gas passage GP, thereby promoting separation of the straight cooling medium flows F1, F2.

Figure 7:
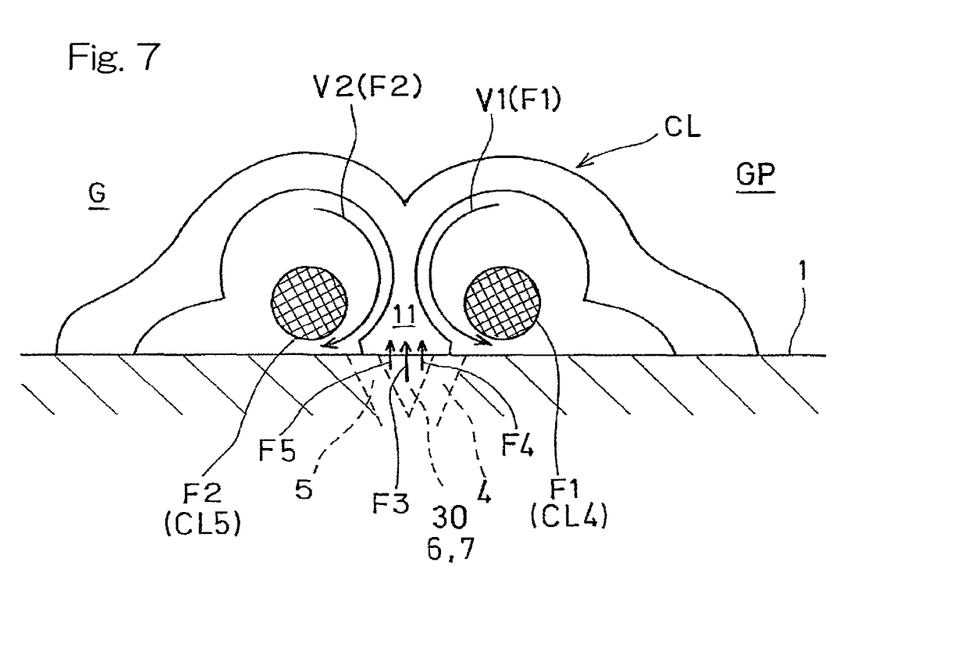
FIG. 7 is a view showing swirl flows of the cooling medium which are formed on an outer surface of the wall surface.

FIG. 7 shows a transverse cross section of the high-temperature gas passage GP, which is orthogonal to the flow direction of the high-temperature gas G. The main separated flow F3 and the sub separated flows F4, F5 from the main passage downstream portion 30 and the communication passages 6, 7 allow the straight cooling medium flows F1, F2 having high directivities, from the branch passages 4, 5, to be separated from each other in the direction parallel to the wall surface 1. As a result, a forceful low-pressure region 11 is generated between the straight cooling medium flows F1, F2. The forceful low-pressure region 11 causes flows oriented toward the wall surface 1, in inner portions of the straight cooling medium flows F1, F2, i.e., in portions thereof facing each other. As a result, swirl flows V1, V2 oriented in opposite directions are generated in the straight cooling medium flows F1, F2 such that the swirl flows V1, V2 inwardly swirl the cooling medium C toward the wall surface 1. The swirl flows V1, V2 act to push the straight cooling medium flows F1, F2, respectively, against the wall surface 1.

By generating the low-pressure region 11 effectively, the swirl flows V1, V2 are formed to push the cooling medium C against the wall surface 1. For this purpose, the two branch passage outlets 4a, 5a shown in FIG. 6 need to be apart from each other at a suitable distance. The branch passage outlets 4a, 5a in the injection port 2 facing the wall surface 1 have substantially oval shapes having major axes along the axes C4, C5 of the branch passages 4, 5. A distance W between the centers O1, O2 of the pair of branch passage outlets 4a, 5a along the wall surface 1 is preferably within a range of 1.0D to 5.0D, and more preferably within a range of 1.5D to 4.0D, with respect to the above-mentioned constant inner diameter D. If the distance W is shorter than the above range, separation of the swirl flows V1, V2 becomes difficult. If the distance W is longer than the above range, straightness of the straight cooling medium flows F1, F2 becomes insufficient, and the swirl flows V1, V2 having a desired force cannot be obtained.

The transverse injection angle β formed between the injection direction A (B) from the branch passage 4 (5) and the flow direction of the high-temperature gas G is preferably within a range of 10 to 45 degrees. The transverse injection angle β is preferably within a range of 20 to 40 degrees, and more preferably within a range of 25 to 35 degrees. If the transverse injection angle β is less than the above range, separation of the swirl flows V1, V2 becomes difficult. If the angle β exceeds the above range, straightness of the straight cooling medium flows F1, F2 becomes insufficient, and the swirl flows V1, V2 having a desired force cannot be obtained.

The transverse injection angles β, β formed between the injection directions A, B from the branch passages 4, 5 and the flow direction of the high-temperature gas G, respectively, may be different from each other. For example, when the axis C3 of the main passage 3 is not along the flow direction of the high-temperature gas G, if the injection directions A, B from the branch passages 4, 5 are set to be symmetrical with respect to the axis C3 of the main passage 3, the transverse injection angle β with respect to the high-temperature gas G differs between the branch passages 4, 5.

The main longitudinal angle α1 formed between the axis C3 of the main passage 3 and the wall surface 1 shown in FIG. 4 is preferably within a range of 10 to 45 degrees, and more preferably within a range of 20 to 40 degrees. On the other hand, the branch longitudinal angle α2 formed between the branch passage 4 (5) and the wall surface 1 is preferably within a range of 5 to 40 degrees, and more preferably within a range of 10 to 35 degrees. If the main longitudinal angle α1 and the branch longitudinal angle α2 are less than the above ranges, the swirl flows V1, V2 shown in FIG. 7 are too close to the wall surface 1. If the angles α1 and α2 exceed the above ranges, the swirl flows V1, V2 are too far from the wall surface 1. In both cases, the swirl flows V1, V2 having a desired force cannot be obtained.

An angular difference δ (=α1−α2) between the main longitudinal angle α1 and the branch longitudinal angle α2 shown in FIG. 4 is preferably within a range of 3 to 15 degrees, and more preferably within a range of 5 to 12 degrees. If the angular difference is outside the above range, the function of the separated flow F3 from the main passage 3 shown in FIG. 6 to separate the swirl flows V1, V2 shown in FIG. 7 is degraded, and the swirl flows V1, V2 having a desired force cannot be obtained.

A ratio Lc/H of the height of the branch point P to the height H of the main passage in the wall 10 shown in FIG. 4, i.e., to the thickness of the wall 10, is preferable within a range of 0.3 to 0.9, and more preferably within a range of 0.4 to 0.8. This ratio corresponds to a ratio of the length of a portion of the main passage 3 which is upstream relative to the branch point P to the entire length L of the main passage 3. If the length ratio Lc/H is less than the above range, straightness of the separated flow F3 injected from the main passage 3 shown in FIG. 6 is degraded, and the function of separating the straight flows F1, F2 from the branch passages 4, 5 is degraded. If the length ratio Lc/H exceeds the above range, the supply amounts of the cooling medium components CL4, CL5 to the branch passages 4, 5 become insufficient. Therefore, in both cases, the swirl flows V1, V2 having a desired force cannot be obtained.

The entire length L of main passage 3 is preferably within a range of 2D to 10D in relation to the constant inner diameter D. If the entire length L is less than 2D, the directivities of the cooling medium components injected from the main passage 3 and the branch passages 4, 5 are degraded. If the entire length L exceeds 10D, passage resistance is increased.

Figure 5:
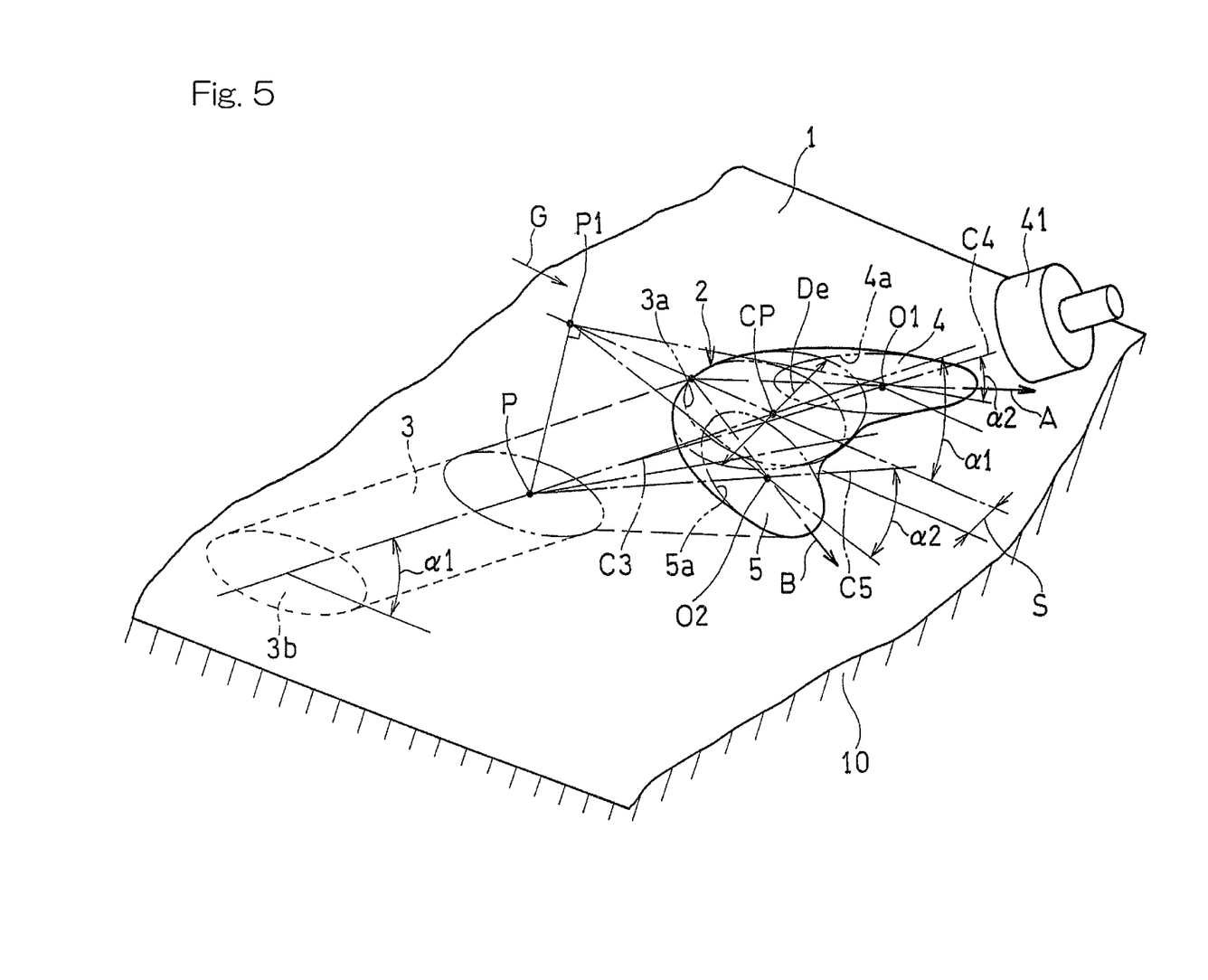
FIG. 5 is a perspective view showing the cooling structure.

Next, a method of manufacturing the above-mentioned cooling structure will be described. As shown in FIG. 5, all the main passage 3, the branch passages 4, 5, and the communication passages 6, 7 are machined from the wall surface 1 side by using a cylindrical machining electrode 41 of an electric-discharge machine. The machining electrode 41 has a predetermined outer diameter slightly smaller than the constant inner diameter D, in order to form the passages 3 to 7 each having the constant inner diameter D. First, the main passage 3 is formed by electric-discharge machining using the machining electrode 41. Next, the passages from the communication passages 6, 7 to the branch passages 4, 5 are continuously formed by performing discharging with the machining electrode being inclined with respect to the axis C3 of the main passage 3. By performing the continuous machining with the single machining electrode 41 being appropriately inclined as described above, all the main passage 3, the branch passages 4, 5, and the communication passages 6, 7 can be machined from the wall surface 1 side, and thus the manufacturing of the cooling structure is facilitated.

According to the above-described cooling structure, as shown in FIG. 7, the cooling medium components CL4, CL5 injected from the pair of branch passages 4, 5 are pushed against the wall surface 1 by the swirl flows V1, V2 inwardly swirled to the low-pressure region 11, and contact a wide range of the wall surface 1, thereby forming a film flow of the cooling medium CL. In this way, the cooling medium CL is suppressed from being separated from the wall surface 1, and the film efficiency on the wall surface 1 is enhanced. As a result, the wall surface 1 is effectively cooled.

Figure 8:
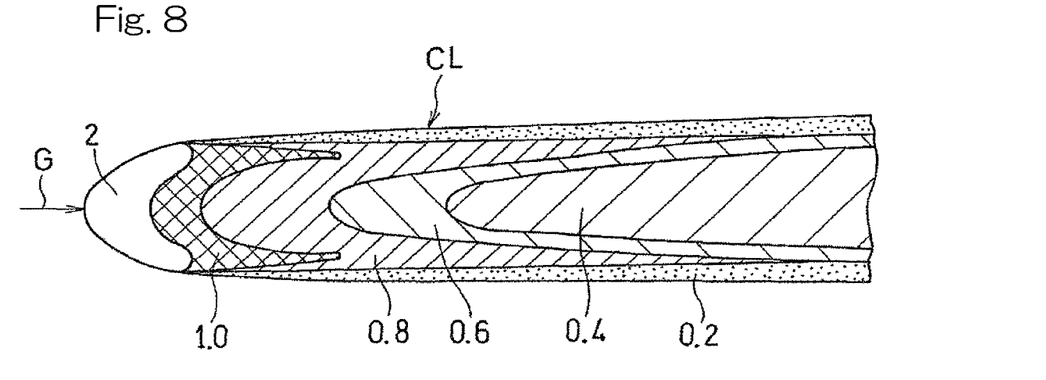
FIG. 8 is an isogram diagram of film efficiency obtained on the wall surface.

FIG. 8 is an isogram diagram of the film efficiency ηf,ad obtained on the wall surface 1 when parameters including the dimensions and ratios shown in FIG. 2 and FIG. 4 are set as follows.

constant inner diameter D=15 mm
wall-thickness to constant-inner-diameter ratio H/D=3.5
length ratio Lc/H=0.625
main longitudinal angle $\alpha_1$=30°
major-axis to minor-axis ratio of center portion of injection port De/D=2.0
injection angular difference δ=10°
transverse injection angle β=32°
linear length of communication passage outlet S/D=0.2
front end position of injection port x/D=−1.0

(where x indicates a distance from a center point CP, shown in FIG. 4, as an origin at which the axis C3 of the main passage 3 intersects the wall surface 1, toward the downstream side of the high-temperature gas G. A negative sign indicates a distance from the origin CP to the upstream side.)

As is clearly seen from FIG. 8, the cooling medium CL injected from the injection port 2 forms a region of a film efficiency of 1.0 near its downstream side, a region of a film efficiency of 0.8 behind the region of the film efficiency of 1.0, a region of a film efficiency of 0.6 inward the region of the film efficiency of 0.8 in its width direction, a region of a film efficiency of 0.4 inward the region of the film efficiency of 0.6 in the width direction, and a region of a film efficiency of 0.2 at its outermost side, each of these regions being formed over a wide area. By forming the film flow of the cooling medium C having such an extremely high film efficiency on the wall surface 1, the cooling medium C is prevented from being separated from the wall surface 1, and thus efficient cooling of the wall surface 1 is performed.

It was confirmed that, of the above-mentioned parameters, when Lc/H=0.75, δ=7.5°, and β=32° are satisfied, a sufficiently high film efficiency is obtained as a whole although the film efficiency near the injection port 2 shown in FIG. 8 is reduced about 10%. Further, it was confirmed that, when Lc/H=0.5, δ=7.5°, and β=29° are satisfied, a sufficiently high film efficiency is obtained as a whole although the film efficiency is reduced about 10% as a whole as compared to the film efficiency shown in FIG. 8. Further, it was confirmed that, when Lc/H=0.5, δ=5°, and β=29° are satisfied, a film efficiency as high as that of the embodiment of Patent Document 2 is obtained although the film efficiency is reduced about 20% as a whole as compared to the film efficiency shown in FIG. 8.

EXAMPLES

Figure 9:
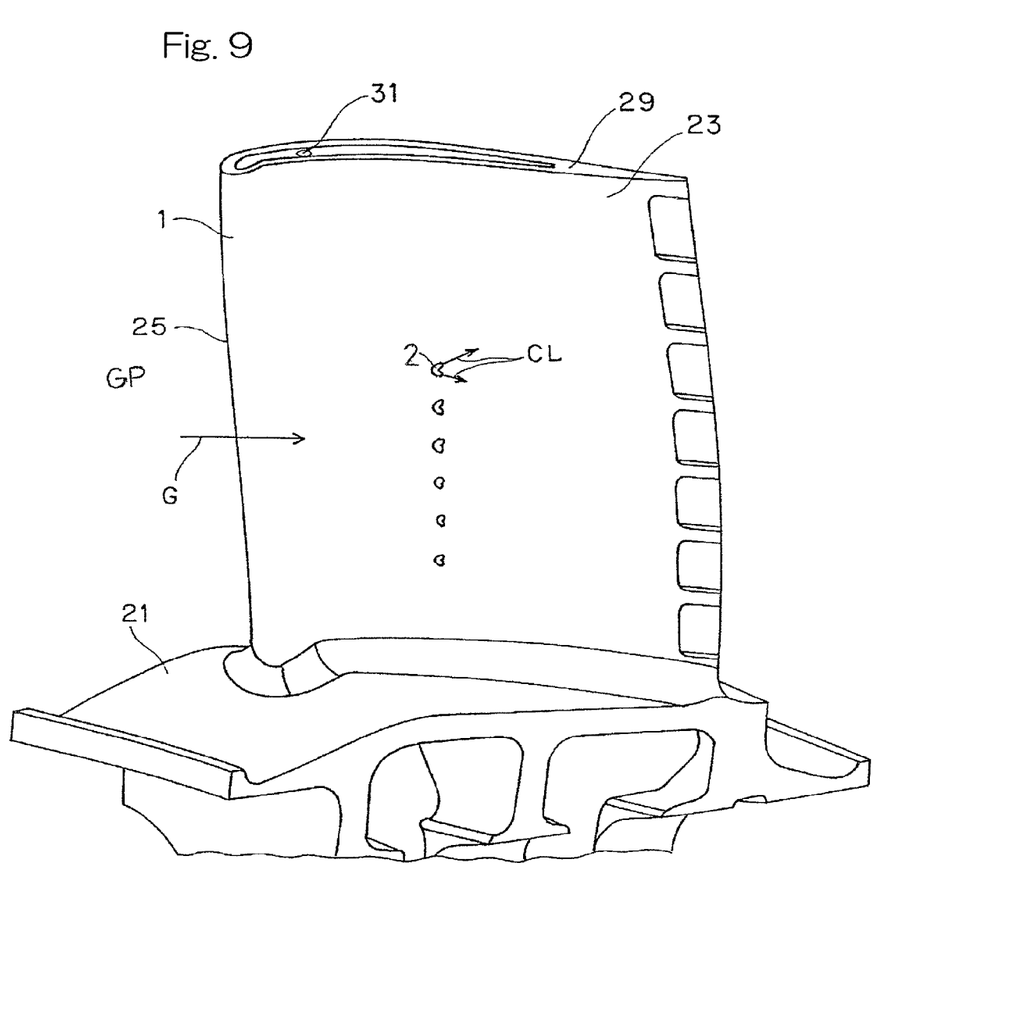
FIG. 9 is a perspective view of a turbine rotor blade showing an example of the present invention.
Figure 10:
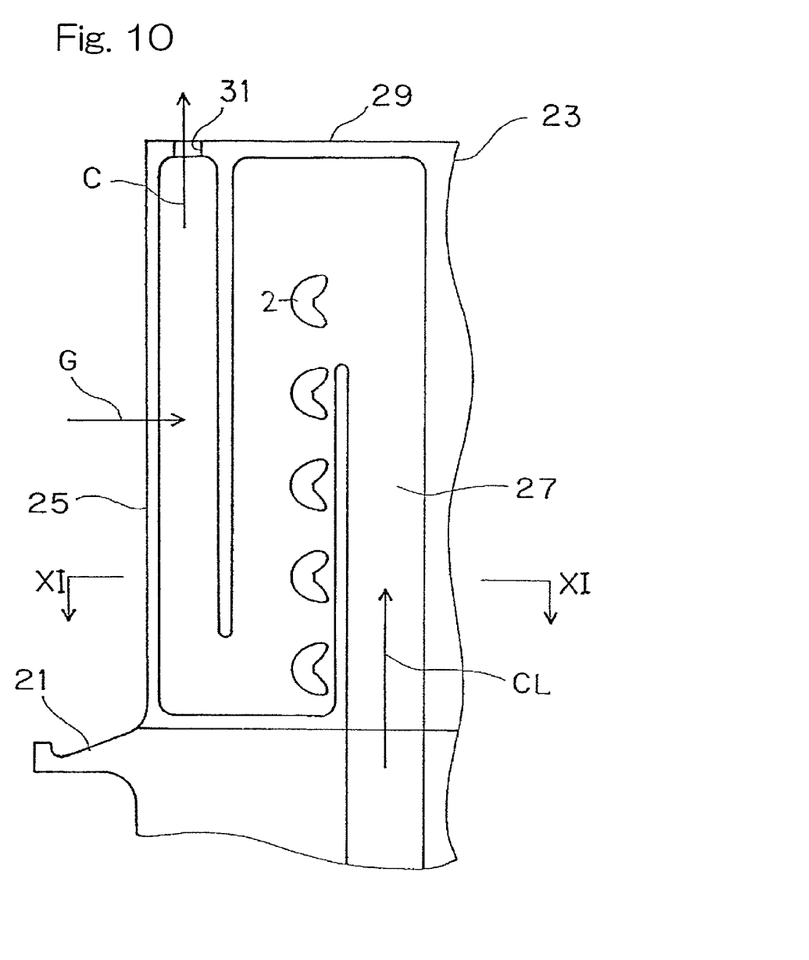
FIG. 10 is a longitudinal cross-sectional view of the turbine rotor blade.
Figure 11:
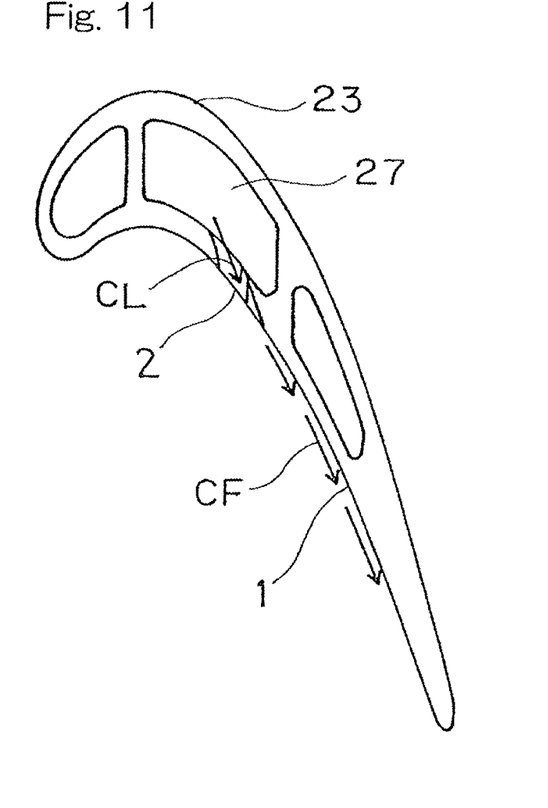
FIG. 11 is a transverse cross-sectional view taken along a line XI-XI in FIG. 10.

FIGS. 9 to 11 show examples in which the present invention is applied to a turbine blade of a gas turbine. The gas turbine includes a compressor for compressing air, a combustor which is supplied with a fuel and the compressed air from the compressor and combusts the fuel, and a turbine driven by a high-temperature and high-pressure combustion gas supplied from the combustor. The turbine is configured such that many rotor blades 23 are implanted in an outer peripheral portion of a turbine disk 21 shown in FIG. 9. In a portion of a blade surface (wall surface 1) of the rotor blade 23, which portion is slightly rearward relative to a front edge 25, six injection ports 2 are aligned in a radial direction of the rotor blade 23, and the injection ports 2 face a high-temperature gas (combustion gas) passage GP between adjacent rotor blades 23.

Inside the rotor blade 23, a cooling medium passage 27 having a folded shape as shown in FIG. 10 is formed. The injection ports 2 communicate with an intermediate portion of the cooling medium passage 27. A cooling medium CL composed of air that has been extracted from the compressor is introduced into the cooling medium passage 27 through a passage in the turbine disk 21, and injected from the injection ports 2. Thereafter, the cooling medium CL is injected into the passage GP through a jet hole 31 opened in a blade tip 29. In this way, the cooling medium CL injected from the injection ports 2 opened in the blade surface, which is the wall surface 1 shown in FIG. 11, forms a film flow CF of the cooling medium C on the blade surface 1, whereby the rotor blade 23 is effectively cooled.

While in the above examples, the plurality of injection ports 2 are aligned at equal intervals in the up-down direction, the number and arrangement of the plurality of injection ports 2 may be appropriately selected. For example, two lines, each line being formed of a plurality of injection ports 2 aligned at equal intervals in the radial direction, may be formed spaced apart from each other in the front-rear direction such that the radial positions of the injection ports 2 in the front line are shifted from the radial positions of the injection ports 2 in the rear line.

The present invention is widely applicable to wall surfaces facing the high-temperature gas passage, such as a stator blade, an inner tube of a combustor, and the like, as well as the rotor blade of the gas turbine.

Although the present invention has been described above in connection with the embodiments thereof with reference to the accompanying drawings, numerous additions, changes, or deletions can be made without departing from the gist of the present invention. Accordingly, such additions, changes, or deletions are to be construed as included in the scope of the present invention.

Although the embodiments have been described above with reference to the drawings, those skilled in the art will readily conceive various changes and modifications within the framework of obviousness upon the reading of the specification herein presented of the present invention. Accordingly, such changes and modifications are to be construed as included in the scope of the present invention as delivered from the claims annexed hereto.

REFERENCE NUMERALS

1 . . . Wall surface
2 . . . Injection port
3 . . . Main passage
4, 5 . . . Branch passage
6, 7 . . . Communication passage
10 . . . Wall
16, 17 . . . Envelope surface
A, B . . . Cooling medium injection direction
V1, V2 . . . Swirl flow
CL, CL3 to CL7 . . . Cooling medium
D . . . Constant inner diameter
G . . . High-temperature gas
GP . . . High-temperature gas passage
$\alpha 1$ . . . Main longitudinal angle
$\alpha 2$ . . . Branch longitudinal angle
$\beta$ . . . Transverse injection angle

What is claimed is:

1. A double-jet film cooling structure comprising:
   an injection port, formed on a wall surface facing a passage of a high-temperature gas, to inject a cooling medium toward a downstream side of the passage;
   a main passage in the form of a straight round hole formed in the wall to supply the cooling medium to the injection port;
   a pair of branch passages formed in the wall, branching from a branch point on the main passage, each in the form of a straight round hole having the injection port as an outlet; and
   communication passages formed in the wall that allow the main passage to communicate with respective branch passages and have the injection port as an outlet,
   wherein injection directions of cooling medium components injected from the pair of branch passages are inclined with respect to a flow direction of the high-temperature gas so as to form respective swirl flows of the cooling medium components oriented in directions to push each other against the wall surface,
   the main passage and the branch passages have transverse cross-sections having the same constant inner diameters,
   each of the communication passages has an envelope surface obtained by continuously arranging straight round holes each of which passes the branch point and has a transverse cross-section having the constant inner diameter,
   transverse injection angles $\beta$ of the injection directions from the pair of branch passages with respect to the flow direction of the high-temperature gas, along the wall surface, are set to be oriented in opposite directions from each other with respect to the flow direction, and
   a main longitudinal angle $\alpha 1$ formed between an axial direction of the main passage and the wall surface is set to be greater than a branch longitudinal angle $\alpha 2$ formed between an axial direction of each branch passage and the wall surface.

2. The double-jet film cooling structure as claimed in claim 1, wherein an angular difference $\delta$ between the main longitudinal angle $\alpha 1$ and the branch longitudinal angle $\alpha 2$ is within a range of 3 to 15 degrees.

3. The double-jet film cooling structure as claimed in claim 1, wherein a rear surface portion of the envelope surface forming the communication passages is a flat surface.

4. The double-jet film cooling structure as claimed in claim 1, wherein a ratio Lc/H of a height Lc of a branch point of each of the branch passages to a height H of the main passage in a direction orthogonal to the wall surface is within a range of 0.3 to 0.9.

5. The double-jet film cooling structure as claimed in claim 1, wherein the transverse injection angle $\beta$ from each of the branch passages is within a range of 10 to 45 degrees.

6. The double-jet film cooling structure as claimed in claim 1, wherein the main longitudinal angle $\alpha 1$ of the main passage is within a range of 10 to 45 degrees.

7. The double-jet film cooling structure as claimed in claim 1, wherein a distance W, along the wall surface, between outlets of the pair of branch passages is set within a range of 1.0D to 5.0D with respect to a constant inner diameter D of the main passage.

8. A method of forming the double-jet film cooling structure as claimed in claim 1 by electric-discharge machining, comprising:
   forming the main passage having the constant inner diameter in the wall surface facing the passage of the high-temperature gas, by use of a cylindrical machining electrode having a predetermined outer diameter; and
   performing discharging with the machining electrode being inclined with respect to an axis of the main passage to continuously form the passages from the communication passages to the branch passages.

* * * * *